US008102552B2

(12) United States Patent
Wells et al.

(10) Patent No.: US 8,102,552 B2
(45) Date of Patent: Jan. 24, 2012

(54) PERFORMANCE MONITORING AND CONTROL OF A MULTIFUNCTION PRINTER

(75) Inventors: Kim Phuong Wells, Washougal, WA (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 956 days.

(21) Appl. No.: 12/062,275

(22) Filed: Apr. 3, 2008

(65) Prior Publication Data
US 2009/0251719 A1 Oct. 8, 2009

(51) Int. Cl.
*G06F 3/12* (2006.01)
*H04N 1/00* (2006.01)
(52) U.S. Cl. .................. 358/1.15; 358/404; 358/406
(58) Field of Classification Search .............. 358/1.16, 358/1.13, 448, 444
See application file for complete search history.

(56) References Cited

U.S. PATENT DOCUMENTS

| | | | |
|---|---|---|---|
| 5,210,872 A | 5/1993 | Ferguson et al. | |
| 5,636,124 A | 6/1997 | Rischar et al. | |
| 5,864,680 A | 1/1999 | Edblad et al. | |
| 6,076,174 A | 6/2000 | Freund | |
| 6,085,215 A | 7/2000 | Ramakrishnan et al. | |
| 6,092,095 A | 7/2000 | Maytal | |
| 6,110,220 A | 8/2000 | Dave et al. | |
| 6,178,542 B1 | 1/2001 | Dave | |
| 6,253,313 B1 | 6/2001 | Morrison et al. | |
| 6,349,325 B1 | 2/2002 | Newcombe et al. | |
| 6,360,243 B1 | 3/2002 | Lindsley et al. | |
| 6,393,433 B1 | 5/2002 | Kalavade et al. | |
| 6,430,594 B1 | 8/2002 | Akiyama et al. | |
| 6,947,388 B1 | 9/2005 | Wagner | |
| 6,993,644 B2 | 1/2006 | Anand et al. | |
| 7,028,204 B2 | 4/2006 | Jammes et al. | |
| 7,191,440 B2 | 3/2007 | Cota-Robles et al. | |
| 7,237,242 B2 | 6/2007 | Blythe et al. | |
| 7,349,110 B2 * | 3/2008 | Nozato ................. 358/1.13 |
| 7,798,590 B2 * | 9/2010 | Snyder ................. 347/14 |
| 2002/0099756 A1 | 7/2002 | Catthoor et al. | |
| 2003/0009508 A1 | 1/2003 | Troia et al. | |
| 2003/0037089 A1 | 2/2003 | Cota-Robles et al. | |
| 2003/0037228 A1 | 2/2003 | Kelsey et al. | |
| 2003/0179763 A1 | 9/2003 | Horiba | |
| 2004/0045006 A1 | 3/2004 | Simonson et al. | |
| 2004/0100642 A1 * | 5/2004 | Nozato ................. 358/1.6 |
| 2004/0139434 A1 | 7/2004 | Blythe et al. | |
| 2004/0193556 A1 * | 9/2004 | Miyamoto et al. .......... 705/412 |
| 2005/0080838 A1 | 4/2005 | Colby et al. | |

(Continued)

FOREIGN PATENT DOCUMENTS

DE 102004053979 A1 8/2005

(Continued)

*Primary Examiner* — Jerome Grant, II
(74) *Attorney, Agent, or Firm* — Marger Johnson & McCollom, P.C.

(57) ABSTRACT

A method and system for monitoring performance of a multifunction printer (MFP) throughout the lifetime of the MFP. The MFP may include a task run-time controller to collect performance information from the MFP and to transmit the performance information to a receiver such as a host, an MFP front panel, or a website. The task run-time controller may include a high resolution timer to collect task execution times or idle time for tasks running on the MFP. The task run-time controller may also receive internal task scheduling policy alterations based on an analysis of the performance information.

19 Claims, 8 Drawing Sheets

U.S. PATENT DOCUMENTS

| | | |
|---|---|---|
| 2005/0081200 A1 | 4/2005 | Rutten et al. |
| 2005/0122980 A1 | 6/2005 | Anand et al. |
| 2005/0233176 A1 | 10/2005 | Takai et al. |
| 2006/0133829 A1* | 6/2006 | Kato .................. 399/8 |
| 2006/0218558 A1 | 9/2006 | Torii et al. |
| 2007/0008993 A1 | 1/2007 | Cha et al. |
| 2007/0165482 A1* | 7/2007 | Asauchi ............ 365/239 |
| 2007/0274165 A1* | 11/2007 | Tanaka et al. .......... 369/30.25 |
| 2008/0018931 A1 | 1/2008 | Tanaka |
| 2008/0137123 A1* | 6/2008 | Nozato .............. 358/1.13 |
| 2008/0239367 A1* | 10/2008 | Podl ................ 358/1.15 |
| 2008/0309966 A1* | 12/2008 | Scaff ............... 358/1.15 |
| 2009/0113156 A1* | 4/2009 | Fujita et al. ........... 711/165 |

FOREIGN PATENT DOCUMENTS

| | | |
|---|---|---|
| EP | 1480407 A1 | 11/2004 |
| EP | 1705570 A2 | 9/2006 |
| JP | 05-088917 | 4/1993 |
| JP | 05-344257 | 12/1993 |
| JP | 08-116390 A1 | 5/1996 |
| JP | 10-228385 A | 8/1998 |
| JP | 2001169275 | 6/2001 |
| JP | 2001-345995 | 12/2001 |
| JP | 2002-358377 A1 | 12/2002 |
| JP | 2004-279777 A | 10/2004 |
| JP | 2006-072972 | 3/2006 |
| JP | 2006-202028 A | 8/2006 |
| JP | 2006-268179 | 10/2006 |
| JP | 2007-060523 | 3/2007 |
| JP | 2007-215078 A | 8/2007 |
| JP | 2007-266964 | 10/2007 |
| JP | 2008-027391 | 2/2008 |
| JP | 2008-028629 A | 2/2008 |
| WO | 02099639 A1 | 12/2002 |
| WO | 2004102363 A1 | 11/2004 |
| WO | 2005045710 A2 | 5/2005 |
| WO | 2005109299 A1 | 11/2005 |
| WO | 2005111807 A2 | 11/2005 |
| WO | 2006102487 A1 | 9/2006 |

* cited by examiner

PERFORMANCE MONITORING AND CONTROL OF A MULTIFUNCTION PRINTER

RELATED APPLICATION DATA

This application is related to commonly-assigned U.S. patent application Ser. No. 12/062,307, filed Apr. 3, 2008, titled "CUSTOM SCHEDULING AND CONTROL OF A MULTIFUNCTION PRINTER," herein incorporated by reference.

BACKGROUND

This application pertains to performance monitoring and controlling of a multifunction printer (MFP), and more particularly, to methods and systems for performance monitoring and controlling the MFP throughout its lifetime.

In an effort to reduce the complexities, costs, and excessive space associated with function-specific printing and scanning machines, MFPs are rapidly being adopted by businesses and individuals the world over. MFPs attract a wide array of users from small start-up companies to large established businesses. The attraction may be attributed to the MFP's versatility as a single machine with multiple capabilities—such as printing, scanning, copying, faxing, and networking.

Conventionally, developers of MFPs (e.g., engineers, technicians, or other developers) have ready access to firmware operating within an MFP during a development cycle. The development cycle may begin in an engineering lab and end at an MFP factory, whereupon the MFP is shipped to a customer or other user. During the development cycle, the developers can monitor performance of the MFP in a relatively effortless manner using specialized tools within a specific development environment. Also, the developers may establish favorable parameters within which the MFP operates according to the performance measurements obtained within their specific development environment. However, once the MFP has been shipped from the factory to the user, it becomes difficult—if not impossible—for the developers to monitor the firmware operating within the MFP. Therefore, the developers do not have visibility or control of the MFP throughout the lifetime of the MFP.

Operating environments of MFPs are unique because usage patterns of the MFP may considerably fluctuate from user to user. Some usage patterns may require the prioritization of one MFP operation, such as printing, over another operation such as scanning. The prioritization of MFP operations requires the prioritization of processor resources of an MFP. The dedication of processor resources to a given MFP operation may come at the expense of other MFP operations.

For example, if the printing operation is currently occupying a significant portion of the processor's resources, other operations such as scanning or copying may be impeded. Or, if the scanning or copying operations are currently occupying a significant portion of the processor's resources, the printing operation may be impeded. As a result, some operations that may be considered more urgent than others during a given period of time could be undesirably delayed. If the usage patterns indicate that the scanning operation should have a higher urgency than ongoing printing operations, the MFP may nonetheless have been constructed to dedicate processor resources first to the printing operation and second to the scanning operation. This may affect work flows to the point of causing loss of time, decreased efficiency, and wasteful usage, which ultimately leads to—at the very least—frustration, or worse, lost profits.

Moreover, usage patterns of the MFP may dictate that certain times of day are more demanding for one operation and less demanding for another operation. For example, if the MFP is used more often in the morning to fulfill urgent printing requests, in the afternoon to fulfill urgent copying requests, and in the evening to fulfill urgent scanning requests, a conventional MFP may not allocate resources appropriately. To make matters worse, once the MFP has been shipped from the factory to the user, it is difficult for the developers to enable or extract performance information related to the usage patterns of the MFP.

As a result, a developer must therefore attempt to replicate the user's particular usage patterns in a lab or at the user's location in an attempt to characterize the performance of the MFP under simulated usage patterns thought to be employed by the user. The replication may never be precise enough to discover the exact problem of the user, or to accurately measure the performance of the MFP under the specific usage patterns. Even where the performance can be measured to some lesser degree of accuracy through the replication effort, after spending time and money on such an effort, the manufacturer of the MFP may have to design a special software patch in an attempt to remedy the inefficiencies discovered as a result of measuring the performance. This can be inconvenient to the user—and costly to the manufacturer—because of the interruption that results from taking the MFP offline to install the special patch, and the effort expended by the manufacturer to design and manage the special patch.

Furthermore, the conventional approach for addressing customer problems fails to provide an efficient cycle of real-time performance monitoring and control of the MFP. In other words, the turn-around time for diagnosing a problem and providing a solution to the user is prohibitively long.

SUMMARY OF THE INVENTION

Example embodiments of the present invention provide for monitoring MFP operations such as scanning, printing, copying, faxing, or networking, among others, throughout the lifetime of the MFP, whether remotely or on-site and in run-time or via firmware upgrade. Performance information may be collected during the monitoring. The performance information may be presented in a user-friendly format, which may convey information about MFP operations such as printing, scanning, copying, faxing, or networking operations to the customer. Alternatively, the performance information may be displayed in a detailed format, which may be particularly useful for skilled technicians or developers who need access to a high-level of detail regarding the performance of the MFP.

In some example embodiments of the present invention, the performance information may be collected for task groups associated with MFP operations using a high resolution timer. The collected performance information may be analyzed and a determination can be made whether to apply an alteration to the MFP internal task scheduling policy responsive to the analysis.

Thus, the performance information can be obtained immediately without replacing the firmware, thereby providing a substantially instantaneous turn-around time for diagnosing a problem and providing a solution to the user.

The foregoing and other aspects of the invention will become more readily apparent from the following detailed description, which proceeds with reference to the accompanying drawings.

DETAILED DESCRIPTION

A multifunction printer (MFP) is capable of performing a variety of operations such as printing, scanning, copying, faxing, and networking, among other operations. While developers can monitor the performance of these operations using specialized tools under a specific development environment, the developers are unable to continue monitoring the performance over the lifetime of the MFP. For example, once the MFP has been shipped from the factory to the customer or user, and is located remotely and placed under operation by the user, the developers lose the ability to monitor internal task performance or other performance information. Similarly, under these circumstances, the developers are unable to easily make alterations to the operating parameters of the MFP such as by making changes to internal task scheduling levels or custom scheduling policies.

I. MFP Monitoring Techniques

Figure 1:
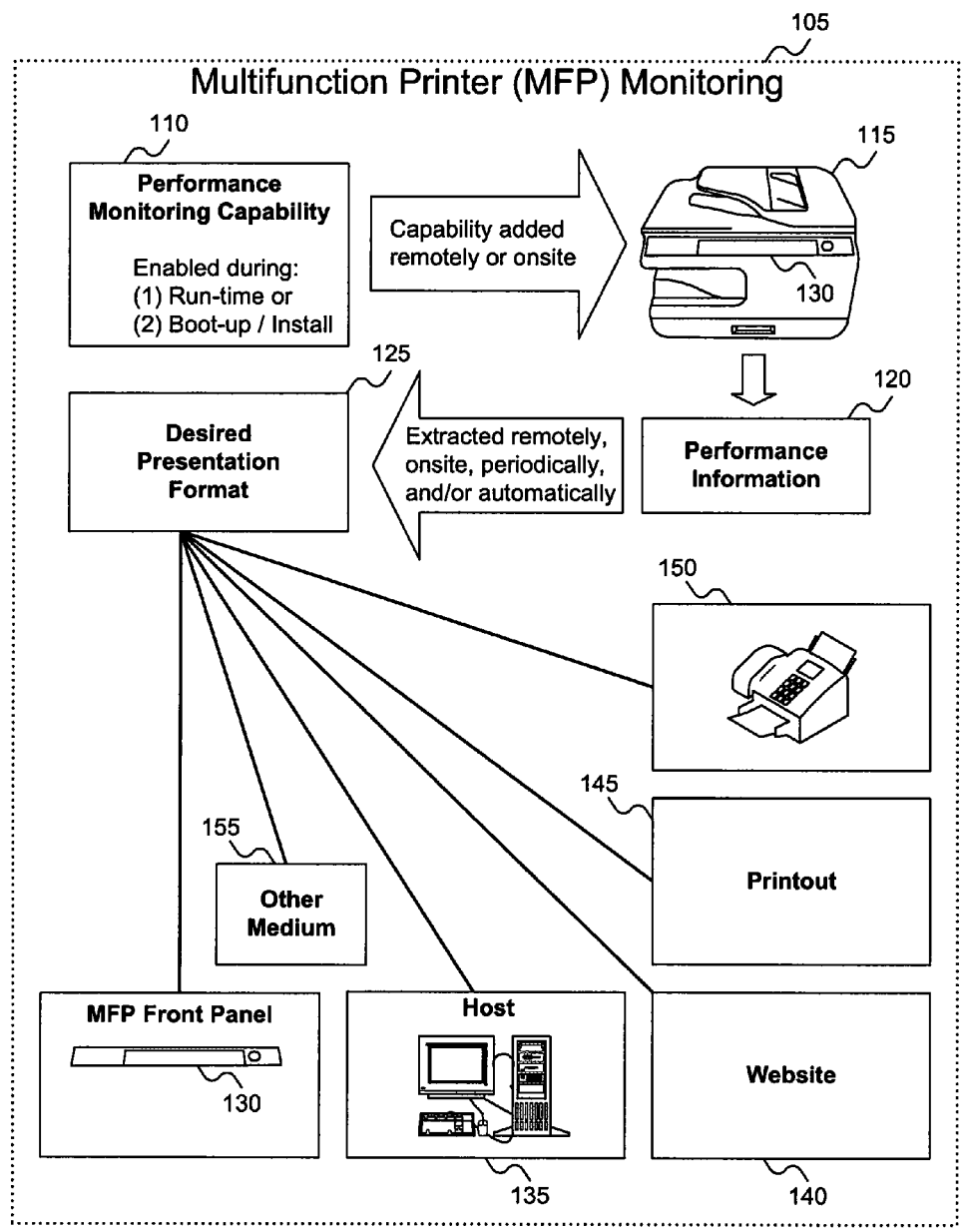
FIG. 1 illustrates a flow diagram of MFP monitoring techniques, according to some example embodiments of the present invention.

FIG. 1 illustrates a flow diagram of MFP monitoring techniques 105, according to some example embodiments of the present invention. The MFP monitoring techniques 105 include an ability to add a performance monitoring capability 110 to an MFP 115, which can be added or enabled either remotely or on-site. In other words, the performance monitoring capability 110 can be added or enabled from a location different from the user's location, or different from wherever the MFP 115 is located. Alternatively, the performance monitoring capability 110 can be added or enabled on-site at the user's location, or a location substantially the same as where the MFP 115 is located.

Furthermore, the performance monitoring capability 110 can be added or enabled during run-time (i.e., on-the-fly) operation of the MFP 115 in one example embodiment. In other words, it is not required that the MFP 115 undergo a boot-up or power cycle to have the monitoring capability 110 added or enabled. Alternatively, the performance monitoring capability 110 may be added or enabled during either a boot-up or firmware installation operation. In another example embodiment, the performance monitoring capability 110 can be enabled by default. Once the performance monitoring capability 110 has been added or enabled to the MFP 115, performance information 120 can thereafter be extracted or collected from the MFP 115.

The performance information 120 may be collected from the MFP 115 either remotely or on-site. In other words, the performance information 120 can collected from a location different from the user's location, or different from wherever the MFP is located. Alternatively, the performance information 120 can be collected on-site at the user's location, or a location substantially the same as where the MFP is located.

The performance information 120 can be presented in different formats. A desired presentation format 125 may be selected. In one example embodiment, the performance information 120 may be presented in a user-friendly format, which may convey information about MFP operations such as printing, scanning, copying, faxing, or networking operations. This format may be particularly useful to a user who is not a skilled technician or developer, but who nevertheless has an interest in knowing how their purchased (or leased) MFP performs. In another example embodiment, the performance information 120 may be presented in a more detailed manner, which may convey information about individual tasks such as internal task scheduling levels, task priorities, task execution times, or a history of processor idle time. In this manner, the performance information 120 may be tailored to include task group information or individual task information. The detailed format may be particularly useful for skilled technicians or developers who need access to a high-level of detail regarding the performance of the MFP.

The performance information 120 may then be sent to a receiver, such as an MFP front panel 130, a host 135, a website 140, a printout 145, a fax machine 150, or some other medium 155, which may be capable of displaying, printing, or otherwise presenting the performance information 120. The performance information 120 may be presented in the desired presentation format 125. The host 135 may be a computer, a portable device such as a phone or personal digital assistant (PDA), among other possibilities. The printout 145 may originate from the MFP 115 or another MFP different from the MFP 115. One or more of the receivers may receive a report or a summary of the performance information 120, and may then present the information to a user or developer.

According to some example embodiments of the present invention, the performance information 120 may be periodically generated and automatically transmitted to the MFP front panel 130, the host 135, or the website 140. Alternatively, the performance information 120 may be periodically generated and displayed responsive to a request by the user, the skilled technician, or the developer.

Also, the performance information 120 may be permanently stored in a non-volatile storage medium such as a read only memory (ROM), a flash memory device, or a hard disk drive (not shown), among other possibilities, whether located within or outside of the MFP 115, thereby providing a way to preserve the performance information 120 even after a power cycle of the MFP 115. Similarly, the performance information 120 may be temporarily stored in either a non-volatile storage medium or a volatile storage medium. Thus, a history of performance information may be recorded and retrieved at a later time as needed.

The MFP 115 may therefore be monitored whether remotely or on-site and in run-time or via firmware upgrade. The performance information 120 may be conveyed to a user using a user-friendly format, which may include less detailed task group information, or to a skilled technician or developer using a high-level of detail of the internal tasks of the MFP 115. The performance information 120 may be transmitted to a receiver such as the host 135, the MFP front panel 130, or the website 140, and displayed using the desired presentation format 125.

II. MFP Task Scheduling Policy Alterations

Figure 2:
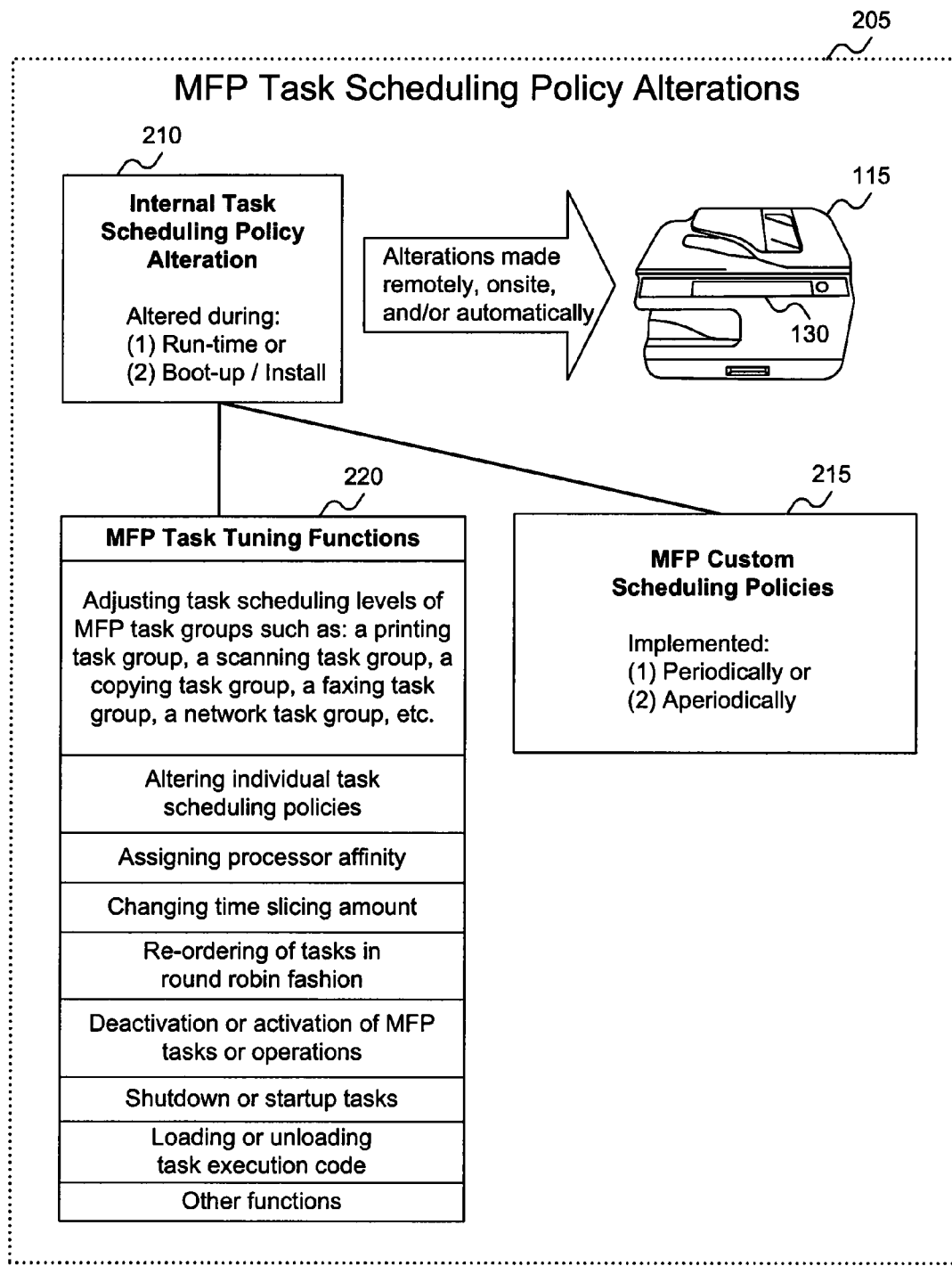
FIG. 2 illustrates a flow diagram of MFP task scheduling policy alterations, according to some example embodiments of the present invention.

FIG. 2 illustrates a flow diagram of MFP task scheduling policy alterations 205, according to some example embodiments of the present invention. The MFP task scheduling policy alterations 205 may include an internal task scheduling policy alteration 210 to internally adjust operating parameters of the MFP 115. The alterations can be made either remotely or on-site. In other words, the internal task scheduling policy alteration 210 may be initiated from a location different from the user's location, or different from wherever the MFP 115 is located. Alternatively, the alteration 210 may be initiated on-site at the user's location, or a location substantially the same as where the MFP 115 is located.

Furthermore, the internal task scheduling policy alteration 210 may be initiated or performed during run-time operation of the MFP 115 in one example embodiment. In other words, it is not required that the MFP 115 undergo a boot-up or power cycle to apply the alteration 210. Alternatively, the internal task scheduling policy alteration 210 may be applied during either a boot-up or firmware installation operation. In some example embodiments, a skilled technician or developer may initiate the internal task scheduling policy alteration 210. In other example embodiments, the alteration 210 may be automatically adjusted, for example, responsive to predefined MFP custom scheduling policies 215, as further discussed below.

Task tuning functions 220 may be used to implement the alteration 210 on the MFP 115 during run-time operation of the MFP 115. For example, the task tuning functions 220 may include adjusting task scheduling levels, altering individual task scheduling policies, assigning processor affinity, changing time slice amount, re-ordering of tasks in round robin fashion, deactivation or activation of tasks or operations, shutdown or startup tasks, loading or unloading task execution code, among other functions.

Specifically, adjusting the task scheduling levels may include changing priority levels of MFP task groups associated with MFP operations such as printing, scanning, copying, faxing, or networking operations. In other word, each operation may have a respective task group associated with it such as a printing task group, a scanning task group, a copying task group, a faxing task group, and a networking task group, among other possibilities. Adjusting the priority level of one of the operations (e.g., such as printing) may be accomplished by adjusting the priority level of processor tasks of a task group associated with the operation (e.g., the printing task group).

Operations of the MFP 115 may be monitored to determine whether one MFP operation should have a higher priority than another MFP operation. For example, if the MFP is heavily occupied with a printing operation while an urgent scanning operation is waiting, the priority levels of a task group associated with the scanning operation may be elevated during run-time of the MFP to accommodate the urgent operation. Other adjustments can be made based on idle time of one or more processors of the MFP 115. Measurements can be taken to identify how much idle time is observed and what tasks are causing the idle time.

The task tuning functions 220 may also include time slicing or round robin algorithms to more efficiently manage operations of the MFP 115. If the MFP 115 has multiple processors, tasks with an affinity to one processor can be shifted to another processor using a processor affinity approach, thereby increasing the performance of the MFP 115. In other words, on a multi-core or multi-processor MFP where idle time is dominant in one core or processor, some tasks can be scheduled on the core or processor with higher idle time to achieve a performance gain.

If the performance information 120 reveals that tasks associated with networking operations are significantly idle, for example, the priority level of the those tasks may be lowered such that more urgent operations like printing are allowed to complete more efficiently. Further, the task tuning functions 220 may be carried out in any fashion, statically or dynamically, non-real-time or real-time. Persons with skill in the art will recognize that other actions functions besides those shown at 220 of FIG. 2 may be performed.

MFP custom scheduling policies 215 may include time-based custom scheduling, usage-based custom scheduling, and installation or upgrade-based custom scheduling, and may be activated either periodically or aperiodically, as further described below. The custom scheduling policies 215 may perform one or more internal task scheduling policy alterations is 210 using the MFP task tuning functions 220 to achieve the desired custom operating environment of the MFP 115.

Because the alterations can be made remotely or on-site and during run-time operation of the MFP, and because the performance information 120 can be collected remotely or on-site and during run-time operation of the MFP, the effectiveness of the task scheduling policy alteration 210 can be obtained immediately without replacing the firmware, thereby providing a substantially instantaneous turn-around time for diagnosing a problem and providing a solution to the user.

Figure 3:
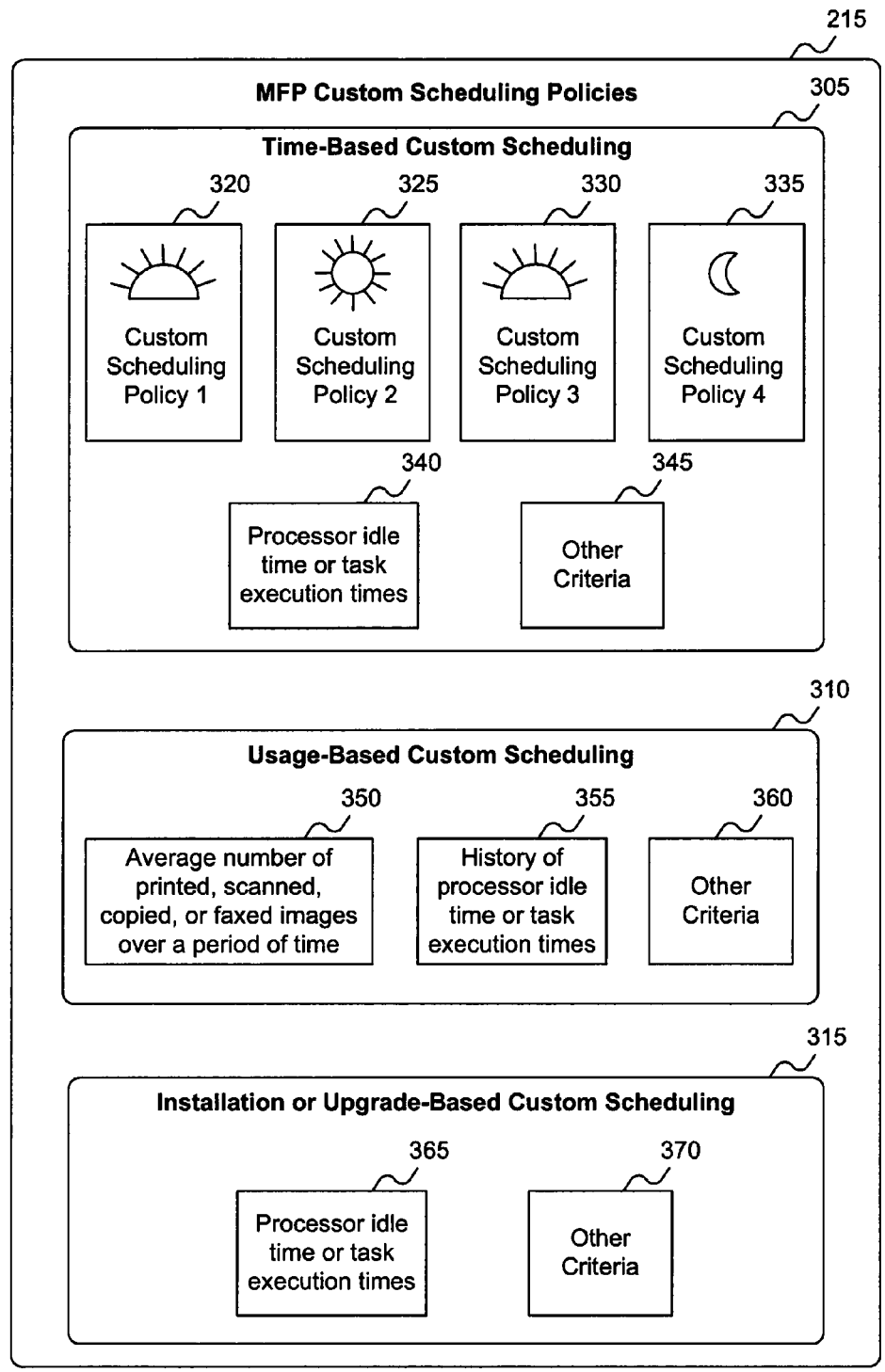
FIG. 3 illustrates custom scheduling policies of an MFP, as introduced in the flow diagram of FIG. 2.

III. Custom MFP Scheduling Policies Based on Time, Usage, Installation, or Upgrade FIG. 3 illustrates custom scheduling policies 215 of the MFP 115, as introduced in the flow diagram of FIG. 2. Custom scheduling policies 215 may include time-based custom scheduling 305, usage-based custom scheduling 310, and installation or upgrade-based custom scheduling 315. The custom scheduling policies may be implemented during run-time operation of the MFP 115, not during run-time operation of the MFP 115, during boot-up, or during an installation of firmware, among other possibilities.

In one example embodiment of the present invention, the custom scheduling policies 215 may be activated manually or customized remotely. In another example embodiment, the custom scheduling policies 215 may be activated automatically. In some example embodiments, the activation of the custom scheduling policies 215 may immediately interrupt the current operation and allow the more urgent operation to begin. Alternatively, the more urgent operation may be allowed to begin after the completion of the current operation. Periodic custom scheduling policies may be established such as a fixed daily routine. Conversely, aperiodic custom scheduling policies may be established on a one-time or a single execution basis.

A. Time-Based Custom Scheduling Policy

The time-based custom scheduling policy 305 may include scheduling polices 1-4, which can be implemented for different periods time. In some example embodiments, a custom based printing scheduling policy can be activated in the morning 320, and a custom scanning policy can be activated in the afternoon 325, among other possibilities. When the custom printing scheduling policy is activated, for example, adjustments can be made to underlying tasks associated with the printing operation. The adjustments can include the internal task scheduling policy alteration 210 using the task tuning functions 220 as explained above.

If printing operations are deemed to be more urgent in the morning 320, faxing operations more urgent at mid-day 330, scanning operations more urgent in the afternoon 325, and faxing operations more urgent in the evening 335, these various custom scheduling policies can be implemented. While a representation of a single day is shown in FIG. 3, different scheduling policies can be activated at different times for any period of time (e.g., a day, week, month, or year, etc.). The time-based scheduling policies 305 similarly can be distributed over a week, month, year, or more than year. Persons with skill in the art will recognize that any combination, number, order, and period of time for the time-based scheduling policies 305 may be used.

Another possible criteria for time-based scheduling is the measurement of performance for specific periods of time collected over a substantial duration, i.e., enough to be able to gather significant statistics of usage patterns. For example, the substantial duration may be on the order of hours, days, weeks, or even years. Thus, even though an operation may be deemed urgent by a user, the performance measurements may dictate a different scheduling policy to optimize or improve the performance of the MFP 115.

Further, the time-based custom scheduling policy 305 may be determined and activated either manually by a user or by a skilled technician, as further explained in detail below, or dynamically using measurements of processor idle time or task execution times 340. Other criteria 345 besides processor idle time or task execution times can also be used. Sometimes the processor idle time or task execution times 340 may contradict the other criteria 345, wherein a determination can be made as to which criteria or statistics should help determine the time-based custom scheduling policy 305.

B. Usage-Based Custom Scheduling

The usage-based custom scheduling policies 310 may be determined based upon statistical usage patterns of the MFP, such as an average number 350 of copied, scanned, faxed, or printed images made over a period of time, or based on a history of processor idle time. The statistical usage patterns may also include a task timing summary, as described below, or other statistics associated with MFP operations. The averages may then be compared to determine which internal task scheduling policy alterations should be made, the possibilities of which are explained in detail above with reference to FIG. 2.

After analyzing the statistical usage patterns, the appropriate custom scheduling policy can be derived and executed at the appropriate time, either through manual intervention by a skilled technician or other user, or alternatively, through dynamic scheduling adjustments without manual intervention. Because measuring and averaging the number of printed, scanned, copied, or faxed images may not require any user interaction with the MFP, the MFP may dynamically monitor and manage the operations so as to determine that one operation, such as printing, should have a higher priority than another operation, such as scanning, and to activate the usage-based custom scheduling policy 310 responsive to the dynamic monitoring.

Alternatively, a skilled technician or developer may actively monitor performance characteristics of the MFP such as a history of processor idle time or task execution times 355, or the average number of printed, scanned, copied, or faxed images 350, and may then manually initiate internal task scheduling policy alterations to adjust the scheduling policy during run-time, as explained in more detail below. Persons with skill in the art will recognize that other criteria 360 besides averages, processor idle time, or task execution times can also be used to determine the custom scheduling policy.

C. Installation or Upgrade-Based Custom Scheduling Policy

The custom scheduling policies of the MFP 115 may also include installation or upgrade-based custom scheduling policies 315. In other words, the custom scheduling policy may be determined at the time of installation of the MFP at a user location based on the expected usage patterns of the user. Or, the custom scheduling policy may be determined while upgrading operational software to the MFP 115. In either case, an estimation can be made by a skilled technician or developer regarding what the expected MFP usage characteristics will be for the particular user location, and activate the installation or upgrade-based custom scheduling policy 315 responsive to the estimation. The estimation may be based on expected or actual processor idle time or task execution times 365, or other criteria 370.

The custom scheduling policies 215 of the MFP 115, whether time-based, usage-based, or installation/upgrade-based, may be stored in non-volatile storage, whether located within or outside of the MFP 115, such as a ROM, a flash memory device, or a hard disk drive, among other possibilities, such that the custom scheduling policies 215 can survive a power cycle of the MFP, or can be otherwise stored, transmitted, recalled, or accessed.

IV. Remote Monitoring and Control

Figure 4:
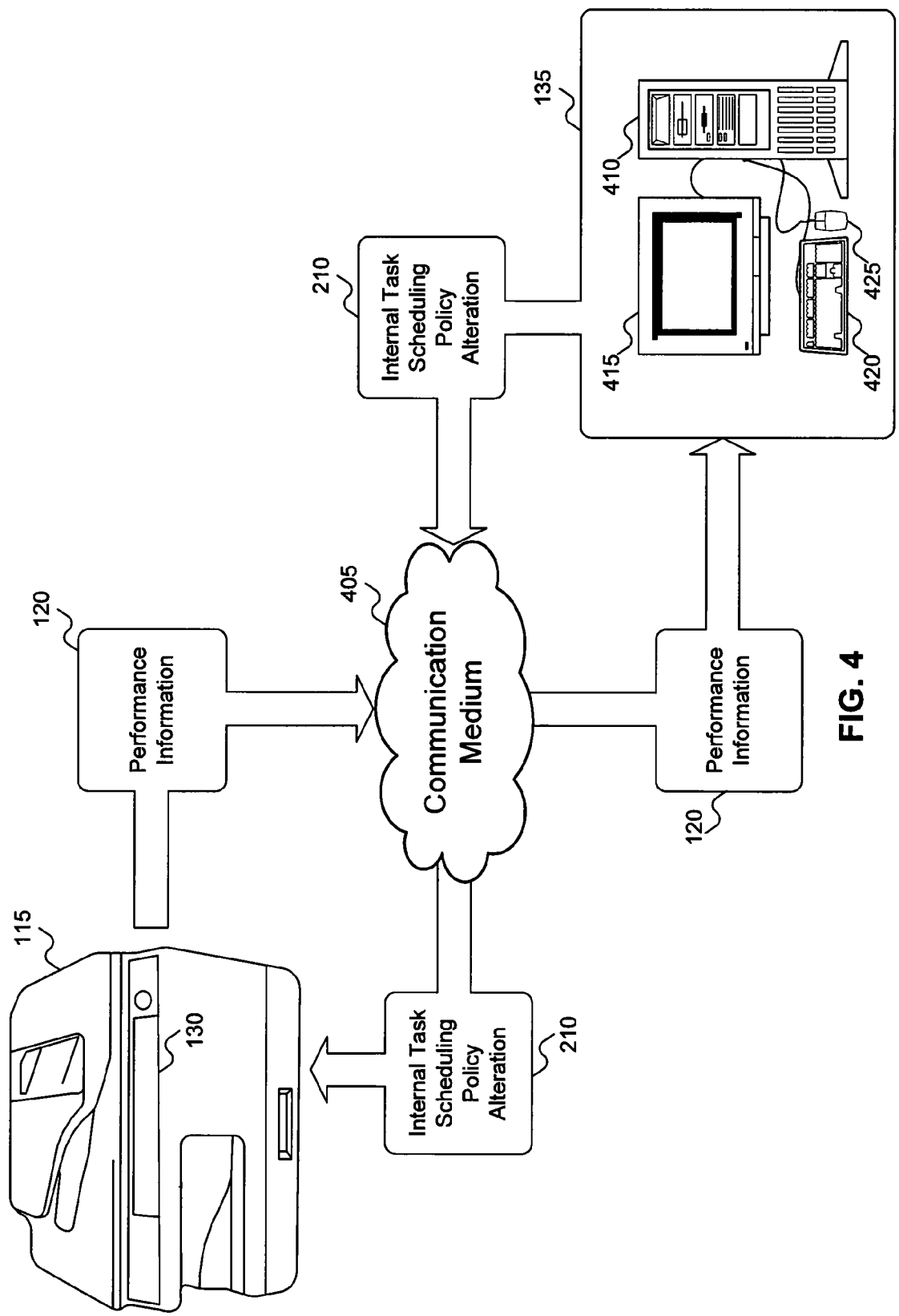
FIG. 4 illustrates the MFP coupled to a host via a communication medium, according to an example embodiment of the present invention.

FIG. 4 illustrates the MFP 115 coupled to the host 135 via a communication medium 405, according to an example embodiment of the present invention. The MFP 115 may be configured to collect performance information 120 associated with the MFP 115. In one example embodiment, the performance information 120 may be transmitted via the communication medium 405 to the host 135. In another example embodiment, the performance information 120 may be displayed to a user via the front panel 130.

The performance information 120 may then be analyzed and the internal task scheduling policy alteration 210 may be determined responsive to the analysis. The alteration 210 may then be activated during run-time of the MFP 115 by either transmitting the alteration 210 from the host 135 to the MFP 115 via the communication medium 405, or by receiving the alteration 210 from a user via the front panel 130.

The host 135 is shown as including computer 410, monitor 415, keyboard 420, and mouse 425. But a person skilled in the art will recognize alternatives that can be used in place of the host 135. For example, a notebook computer, tablet computer, or personal digital assistant (PDA), among other possibilities, may be used instead. Regardless of its form, the host 135 is generally a computer system used by a skilled technician, developer, or user to interact with the MFP 115, enabling an analysis of the performance information 120 and activation of the internal task scheduling policy alteration 210.

A. Schematic View of Remote Monitoring and Control System

Figure 5:
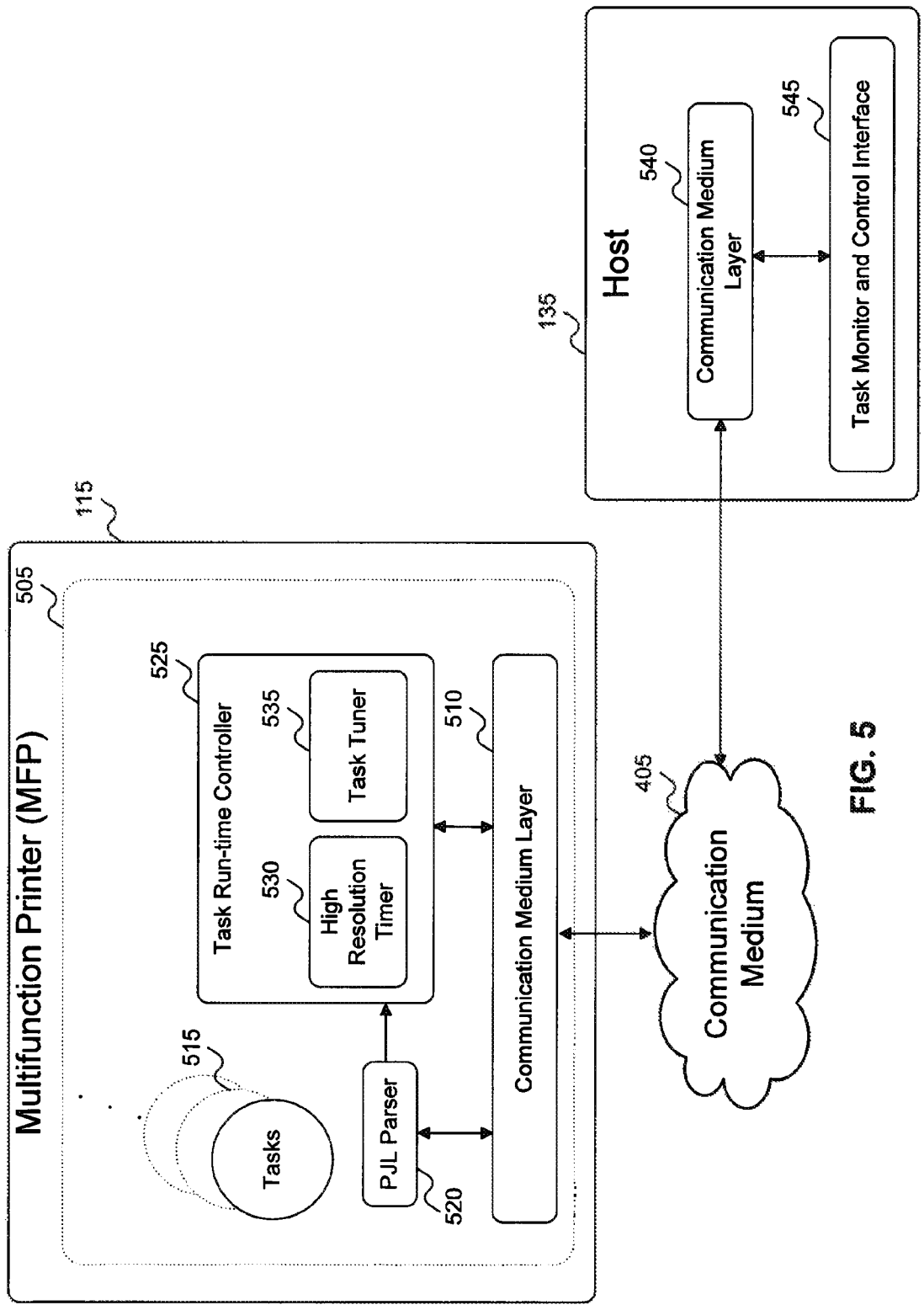
FIG. 5 illustrates a schematic view of the MFP and the host coupled to the communication medium, according to the example embodiment of FIG. 4.

FIG. 5 illustrates a schematic view of the MFP 115 and the host 135 coupled to the communication medium 405, according to the example embodiment of FIG. 4. The MFP 115 may include at least one processor 505 and a communication medium layer 510. The processor 505 may process tasks 515 by context switching each of the tasks according to task priority levels. If the MFP 115 includes two processors 505, the idle time may be measured for each processor using a very low priority task running on each processor. The measurement data may then be included in the performance information 120.

When the performance information 120 reveals that one processor 505 is significantly idle when compared to the other processor 505, then tasks with an affinity to one processor can be shifted to the other processor. Also, if the performance information 120 reveals that tasks associated with networking operations are significantly idle, for example, the priority level of those tasks may be lowered so that more urgent operations like printing are allowed to complete more efficiently. Persons having skill in the art will recognize that other changes to internal task scheduling levels, besides those discussed herein, may be made. The tasks 515 may be grouped into task groups associated with printing, scanning, copying, faxing, or networking operations, to make it easier and more efficient to manage the internal task scheduling policies.

The communication medium layer 510 may be coupled to the communication medium 405. The communication medium layer 510 may comprise User Datagram Protocol (UDP) messaging firmware configured to transmit and receive datagrams including the performance information 120 and the internal task scheduling policy alteration 210 to and from the host 135. However, a person skilled in the art will recognize that different underlying network protocols may be used, such as USB, parallel port, serial port, IEEE 1394, wireless, optical, or infrared, among other possibilities.

B. Internal Task Scheduling Policy Alteration associated with a Printer Job Language (PJL)

The MFP 115 may also include a Printer Job Language (PJL) parser 520, as described in commonly-assigned and co-pending U.S. patent application Ser. No. 11/901,752, filed Sep. 19, 2007, entitled Method and System for Adaptive Control of Imaging Node, which is hereby incorporated by reference. Here, the PJL parser may also be configured to parse at least one internal task scheduling policy alteration (e.g., alteration 210) included in a PJL job transmitted between the host 135 and the MFP 115. The alteration 210 may adjust a priority level of the printing, scanning, copying, faxing, or networking operations, as explained above with reference to FIGS. 2 and 4. The alteration 210 may also include commands to add a task, delete a task, load a task, unload a task, suspend a task, or un-suspend a task, among other possibilities. The PJL parser 520 may be coupled to the communication medium 405 via the communication medium layer 510, and may also receive at least one PJL job from the communication medium 405, and parse or extract the alteration 210 from the PJL job.

C. Task Run-Time Controller

In some example embodiments, the MFP 115 may include a task run-time controller 525 coupled to the PJL parser 520 and the communication medium layer 510. The task run-time controller 525 may transmit the performance information 120 to the host 135 or the front panel 130, and may receive and process the alteration 210 transmitted from the host 135 or the front panel 130. The task run-time controller 525 may include a high resolution timer (HRT) 530, further described below, to collect the performance information 120. A task tuner 535 may also be included as part of the task run-time controller 525, which is further described below, and may be configured to activate the alteration 210 or the custom scheduling policies during run-time operation of the MFP 115, not during run-time operation of the MFP 115, during installation at a user location, during initialization of the MFP 115, or during an upgrade of the MFP 115, among other possibilities. Further, the task run-time controller 525 may include a task manager (not shown) to perform book-keeping operations of the performance information 120 and the alteration 210.

D. Communication Medium Layers

In some example embodiments, the host 135 may include a communication medium layer 540, which may be similar to the communication medium layer 510 of the MFP 115. Generally, the communication medium layers 540 and 510 enable a communication link between the host 135 and the MFP 115. The host 135 may also include a task monitor and control interface 545, which may be used to display the performance information 120, and to allow the user to generate and transmit PJL jobs including the alteration 210 to the MFP 115.

A PJL job may be generated using the host 135, which may be located physically remote from the MFP 115. The PJL job may be transmitted to the MFP 115 via the communication medium 405, and may include at least one requested action, such as a request for the performance information 120. The performance information 120 may be collected for tasks running on the MFP 115 and transmitted from the MFP 115 to the host 135 via the communication medium 405 to be analyzed. The performance information 120 collected from the MFP 115 may include task timing summary and statistics (e.g., 705 of FIG. 7) including measured processor idle time or elapsed execution times associated with each or some of the tasks 515.

As a result, a determination can be made whether an internal task scheduling policy alteration 210 should be sent to the MFP 115. If it is determined that the alteration 210 should be sent, a PJL job may be generated that includes the alteration 210. The PJL job including the alteration 210 may then be transmitted from the host 135 to the MFP 115. The alteration 210 may be parsed from the PJL job using the PJL parser 520, and the internal task scheduling levels or policies may be adjusted according to the alteration 210.

V. Task Tuner of the MFP Task Run-Time Controller

Figure 6:
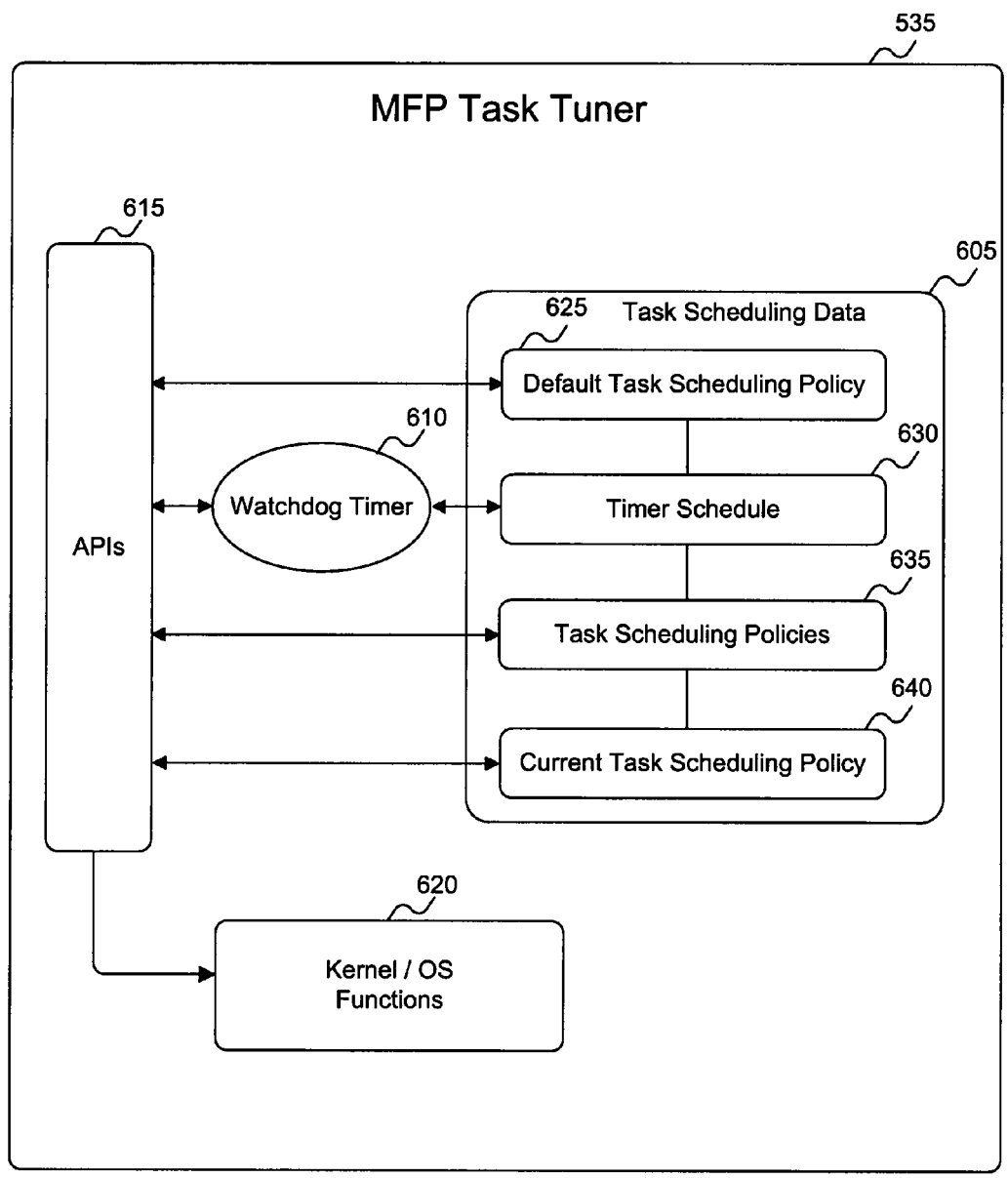
FIG. 6 illustrates a schematic view of the MFP Task Tuner of FIG. 5.

FIG. 6 illustrates a schematic view of the MFP task tuner 535 of the MFP task run-time controller 525 of FIG. 5. The MFP task tuner 535 may include task scheduling data 605, watchdog timer 610, APIs 615, and kernel/operating system (OS) functions 620. The task scheduling data 605 may include default task scheduling policy 625, timer schedule 630, task scheduling policies 635, and current task scheduling policy 640. The task tuner 535 may operationally provide the task tuning functions 220, as previously set forth.

In some example embodiments, the APIs 615 may include an initialization function, which initializes the task tuner 535 to use the default task scheduling policy 625. The default task scheduling policy 625 may be changed using a set default function included in the APIs 615. Alternatively, a task scheduling policy other than the default scheduling policy 625 may be selected from among the task scheduling policies 635 and set to the current task scheduling policy 640. The current task scheduling policy 640 may be changed during run-time of the MFP 115, not during run-time of the MFP 115, during installation of the MFP 115 at a user location, during initialization of the MFP 115, or during an upgrade of the MFP 115, among other possibilities.

The watchdog timer 610 may monitor a status of the timer schedule 630. If the timer schedule 630 indicates that a task scheduling policy has expired, an update function included in the APIs 615 may be used to call one or more kernel/OS functions 620 responsive to a new current task scheduling policy 640. The kernel/OS functions 620 may include a change task priority function, an add task function, a delete task function, a load task function, an unload task function, a suspend task function, or an un-suspend task function, among other functions. Furthermore, as previously explained, the custom task scheduling policies 635 may be stored in non-volatile storage such as a read only memory (ROM), a flash memory device, or a hard disk drive, among other possibilities, whether located within or outside of the MFP 115, such that the scheduling policies 635 can survive a power cycle of the MFP, or can otherwise be stored, transmitted, or accessed.

VI. High Resolution Timer (HRT) of the MFP Task Run-Time Controller

Figure 7:
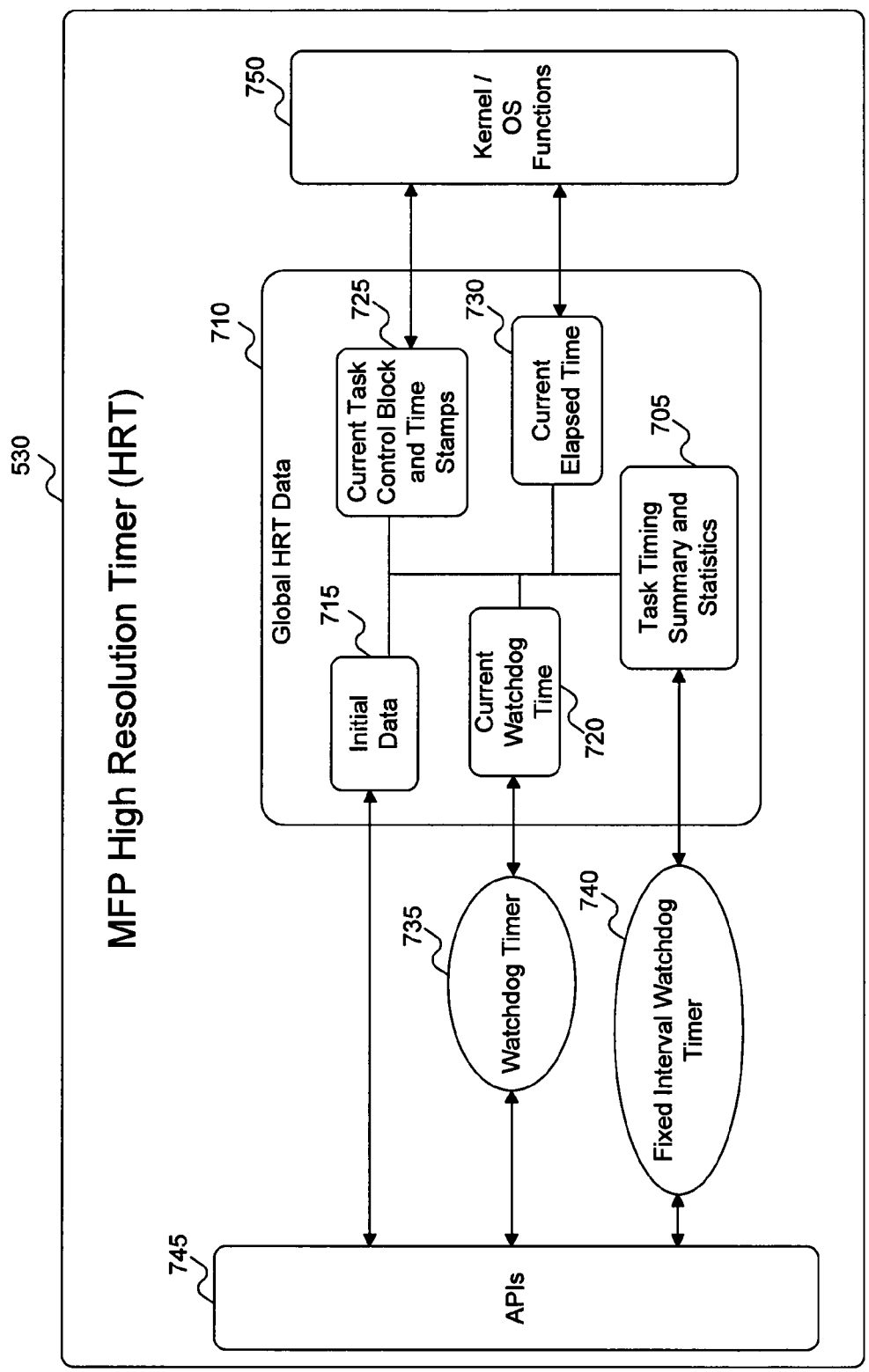
FIG. 7 illustrates a schematic view of the MFP High Resolution Timer (HRT) of FIG. 5.

FIG. 7 illustrates a schematic view of the high resolution timer (HRT) 530 of FIG. 5. The HRT 530 may include global data 710. Global data 710 may include initial data 715, current watch dog time 720, task timing summary and statistics 705, current task control block and time stamps 725, and current elapsed time 730. While FIG. 7 shows watchdog timer 735 and fixed interval watchdog timer 740, any number of watchdog timers may be used. The HRT 530 also includes application programming interfaces 745 and kernel/OS functions 750.

In some example embodiments, watch dog timer 735 may monitor a status of tasks (e.g., tasks 515 of FIG. 5) and update the current watch dog time 720 accordingly. Generally, watch dog timer 735 has a higher timing resolution than the fixed interval watchdog timer 740, and makes use of a calibration function such that the timer will not expire for up to 900 years. The higher resolution is preferably in the micro-second precision range. This helps to alleviate timing limitations of commonly used 32 bit processors. The fixed interval watchdog timer 740 uses a lower timing resolution, and may be used to update the task timing summary and statistics 705. The fixed interval watchdog timer 740 may be stopped and started at any time using APIs 745.

In some example embodiments, beginning and ending execution times for at least some of the tasks are timestamped using the HRT 530. As such, elapsed execution times and/or idle time for each of the tasks can be calculated using the timestamps. The task timing summary and statistics 705 may be generated using the elapsed execution and idle times. The task timing and summary statistics 705 may be included in the performance information 120, and may be analyzed either dynamically by the MFP or manually by a skilled technician or developer.

The APIs 745 may include an initialization function to reset initial data 715, which may include active task control blocks (TCBs). When one of the tasks (e.g., one of tasks 515 of FIG. 5) is created using a task creation kernel/OS function 750, the high resolution timer 710 hooks the task creation kernel/OS function so that the current task control block and time stamps 725 may be updated. When one of the tasks changes states, the high resolution timer 710 hooks the state change so that the current elapsed time 730 may be updated. Similarly, when one of the tasks goes away, the high resolution timer 710 hooks the deletion and may update the current elapsed time 730.

VII. Task Priority Management

Figure 8:
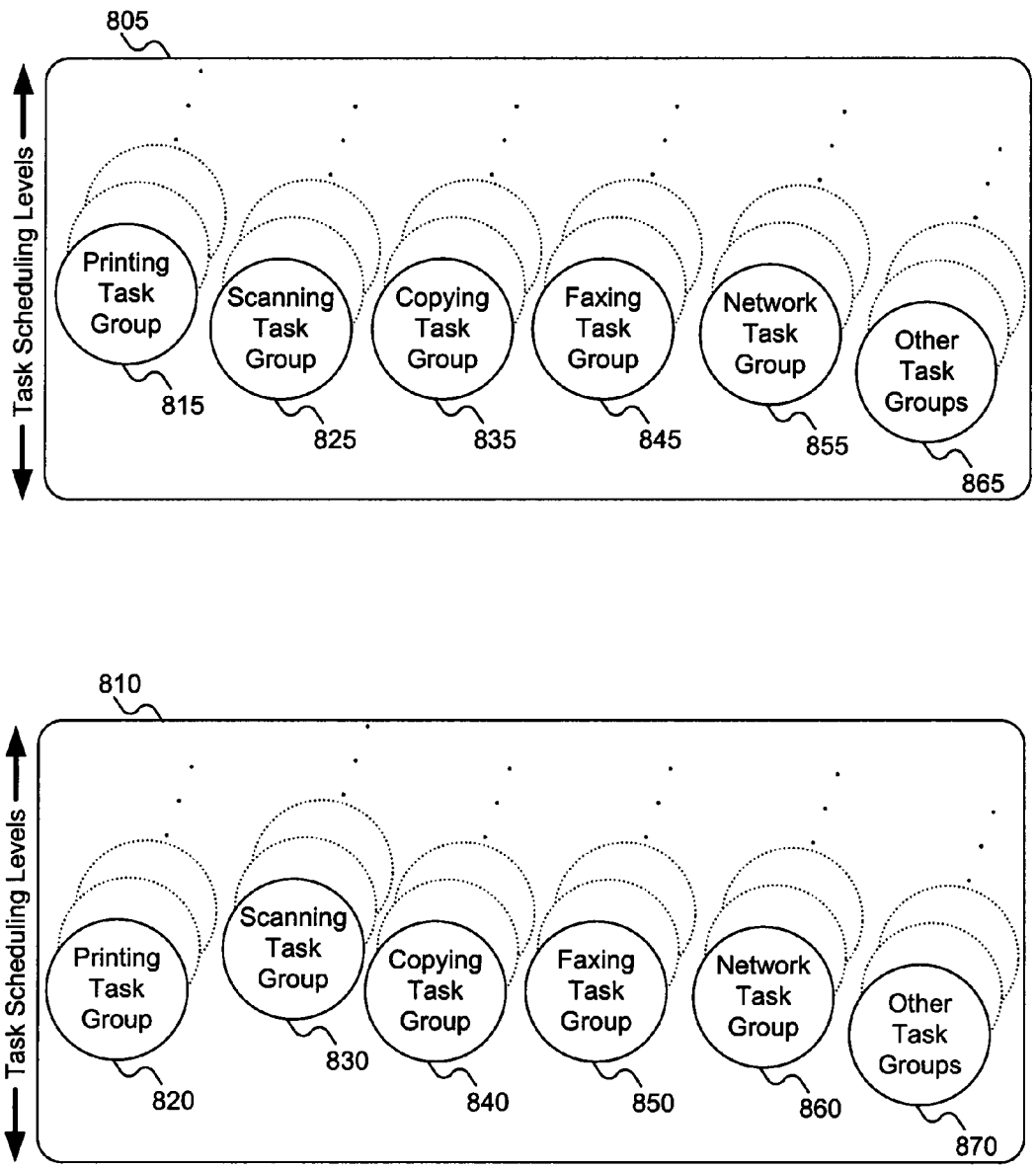
FIG. 8 illustrates an example embodiment of task groups arranged by MFP operation and their associated task scheduling levels.

FIG. 8 illustrates an example embodiment of task groups (e.g., 805, 810) arranged by MFP operation and their associated task scheduling levels. As previously mentioned, MFPs may perform printing operations, scanning operations, copying operations, faxing operations, and networking operations, among other possibilities. The printing task group (e.g., 815, 820) may be associated with the printing operation; the scanning task group (e.g., 825, 830) may be associated with the scanning operation; the copying task group (e.g., 835, 840) may be associated with the copying operation; the faxing task group (e.g., 845, 850) may be associated with the faxing operation; and the networking task group (e.g., 855, 860) may be associated with the networking operation. Other task groups 865 and 870 may also be associated with other operations.

As shown at 805, the priority levels of the printing task group 815 may be elevated during run-time of the MFP responsive to the internal task scheduling policy alteration 210 or responsive to an MFP custom scheduling policy 215 (of FIG. 2), while the priority levels of the remaining task groups (e.g., scanning task group 825, copying task group 835, faxing task group 845, networking task group 855, or other task groups 865) may either be lowered or maintained.

Similarly, as shown at 810, the priority levels of the scanning task group 830 may be elevated during run-time of the MFP, while the priority levels of the remaining task groups (e.g., printing task group 820, copying task group 840, faxing task group 850, networking task group 860, or other task groups 870) may either be lowered or maintained.

Any combination of elevating or lowering of task groups, which are grouped based on MFP operation, may be implemented. For example, adjusting the priority levels may include elevating the priority levels of one of (a) the printing task groups (e.g., 815, 820), (b) the scanning task groups (e.g., 825, 830), (c) the copying task groups (e.g., 835, 840), (d) the faxing task groups (e.g., 845, 850), (e) the networking task groups (e.g., 855, 860), or (f) the other task groups (e.g., 865, 870) above the priority levels of tasks of the remaining groups.

Furthermore, each of the task groups may have a higher priority than the remaining task groups during different periods of time. For example, the priority levels of the printing task group 815 may be adjusted to have a higher or lower priority than the remaining task groups during a first period of time; the priority levels of the scanning task group 825 may be adjusted to have a higher or lower priority than the remaining task groups during a second period of time, and so forth.

VIII. Summary

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an example embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for monitoring internal task performance of a multifunction printer (MFP), comprising:
   enabling a monitoring capability at one of (a) run-time of the MFP and (b) boot-up of the MFP;
   collecting performance information of the MFP over a period of time, wherein collecting the performance information comprises:
   remotely generating a printer job language (PJL) job;
   transmitting the remotely generated PJL job to the MFP using a communication medium; and
   parsing the PJL job using a PJL parser in the MFP to determine at least one requested action; and
   sending the performance information to a receiver.

2. The method of claim 1, wherein the receiver is at least one of (a) a host, (b) an MFP front panel, (c) a printout from the MFP, (d) a report sent to a fax machine, and (e) a website.

3. The method of claim 1, further comprising printing the performance information using a printer.

4. The method of claim 1, wherein collecting the performance information includes:
remotely collecting the performance information using a communication medium from a location different from where the MFP is located.

5. The method of claim 1, wherein collecting the performance information includes:
collecting the performance information on-site at a location substantially the same as where the MFP is located.

6. The method of claim 1, further comprising:
periodically generating the performance information; and transmitting the periodically generated performance information to at least one of (a) the host, (b) the MFP front panel, (c) the printout from the MFP, (d) the report sent to the fax machine, and (e) the website.

7. The method of claim 6, wherein the performance information is automatically generated.

8. The method of claim 1, further comprising:
tailoring the performance information to include individual task information and task group information.

9. The method of claim 1, further comprising:
permanently storing the performance information in a non-volatile storage medium.

10. The method of claim 1, further comprising:
temporarily storing the performance information in at least one of (a) a non-volatile storage medium and (b) a volatile storage medium.

11. The method of claim 1, wherein the at least one requested action indicates a request for the performance information, and wherein collecting the performance information further comprises:
processing the at least one requested action using a task run-time controller of the MFP; and
transmitting the performance information via the communication medium responsive to the request.

12. The method of claim 1, wherein the monitoring capability is enabled by default.

13. A method for monitoring performance of a multifunction printer (MFP), comprising:
enabling a monitoring capability of the MFP;
remotely generating a printer job language (PJL) job from a location different from where the MFP is located, wherein the PJL job indicates a request for performance information;
transmitting the remotely generated PJL job to the MFP;
parsing the PJL job using a PJL parser in the MFP to extract the request;
collecting the performance information using a task run-time controller of the MFP responsive to the parsing; and
transmitting the collected performance information to at least one of (a) a host, (b) an MFP front panel, (c) a printout from the MFP, (d) a report sent to a fax machine, and (e) a website.

14. The method of claim 13, further comprising:
enabling the monitoring capability at one of (a) run-time of the MFP and (b) boot-up of the MFP.

15. The method of claim 13, further comprising:
enabling the monitoring capability by default.

16. The method of claim 13, further comprising:
periodically generating the performance information; and automatically transmitting the periodically generated performance information to at least one of (a) the host, (b) the MFP front panel, (c) the printout from the MFP, (d) the report sent to the fax machine, and (e) the website.

17. A multifunction printer (MFP), comprising:
at least one processor;
a communication medium layer;
a plurality of task groups, each task group being associated with one of printing, scanning, copying, faxing, and networking operations;
a Printer Job Language (PJL) parser coupled to the communication medium layer, the PJL parser to receive at least one PJL job via a communication medium, the PJL parser configured to parse an alteration of an internal task scheduling policy, the alteration included in the PJL job;
a task run-time controller coupled to the PJL parser, the task run-time controller configured to receive and process the alteration, to transmit performance information to a host coupled to the communication medium, and to save the performance information and the alteration, the task run-time controller comprising:
a high resolution timer including at least one watch dog timer configured to monitor a status of a plurality of tasks running on the at least one processor;
a task tuner configured to apply the alteration of the internal task scheduling policy at one of (a) run-time of the MFP and (b) boot-up of the MFP; and
a task manager configured to perform book-keeping operations of the performance information and the alteration.

18. The MFP of claim 17, wherein the alteration included in the PJL job indicates an adjustment of task scheduling levels associated with at least one of the printing, scanning, copying, faxing, and networking task groups.

19. The MFP of claim 17, wherein the communication medium layer comprises User Datagram Protocol (UDP) messaging firmware configured to transmit data grams including at least one of (a) the performance information and (b) the alteration of the internal task scheduling policy between the MFP and the host.

* * * * *